United States Patent
Enoki (10) Patent No.: US 8,904,983 B2
(45) Date of Patent: Dec. 9, 2014

(54) AUTOMATIC STARTING DEVICE FOR ENGINE

(75) Inventor: Keiichi Enoki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1217 days.

(21) Appl. No.: 12/782,100

(22) Filed: May 18, 2010

(65) Prior Publication Data

US 2011/0146609 A1    Jun. 23, 2011

(30) Foreign Application Priority Data

Dec. 17, 2009   (JP) ................................ 2009-286293

(51) Int. Cl.
  *F02N 11/08*   (2006.01)
  *F16H 61/14*   (2006.01)
  *F16H 59/48*   (2006.01)

(52) U.S. Cl.
  CPC ......... *F02N 11/0818* (2013.01); *F02N 2250/04* (2013.01); *F02N 2200/021* (2013.01); *F02N 11/0844* (2013.01); *F16H 61/143* (2013.01); *Y02T 10/48* (2013.01); *F02N 2200/0801* (2013.01); *F16H 59/48* (2013.01); *F02N 2200/101* (2013.01); *F02N 2200/102* (2013.01); *F02N 11/0855* (2013.01)
  USPC .................................................... 123/179.3

(58) Field of Classification Search
  USPC ................ 180/65.2; 701/22, 104, 110, 113; 477/102, 3; 123/179.3, 179.4, 179.28, 123/179.25, 603, 631, 406.18, 406.58; 73/114.22, 114.25, 114.26, 114.59, 73/114.61
  See application file for complete search history.

(56) References Cited

U.S. PATENT DOCUMENTS

| 6,345,216 | B1 * | 2/2002 | Morimoto et al. ............... 701/22 |
| 6,373,206 | B1 * | 4/2002 | Morimoto et al. ............ 318/139 |
| 6,540,644 | B2 * | 4/2003 | Morimoto et al. ............ 477/102 |
| 6,668,224 | B2 * | 12/2003 | Kawai et al. .................... 701/54 |

(Continued)

FOREIGN PATENT DOCUMENTS

DE   10 2005 049 092 A1   4/2007
FR       2 925 615 A1     6/2009

(Continued)

OTHER PUBLICATIONS

German Office Action dated Jun. 5, 2014 issued in German Application No. 10 2010 019 304.6.

*Primary Examiner* — Hai Huynh
*Assistant Examiner* — Gonzalo Laguarda
(74) *Attorney, Agent, or Firm* — Sughrue Mion, PLLC; Richard C. Turner (57) ABSTRACT

An automatic starting device for the engine, which quietly and quickly restarts the engine when a re-acceleration request is made by a driver, is provided. In a case where it is judged that a vehicle is decelerating and fuel injection is currently stopped, when it is then judged that a brake pedal is released and an engine rpm is smaller than an engine rpm which allows recovery from a fuel-supply stop state, the controller disengages a lock-up clutch. Upon detection of reverse rotation of the engine based on a detection signal of the crank-angle sensor, the controller controls a pinion gear to be pushed out by a lever of a starter to be meshed with a ring gear. After the ring gear is rotated by a predetermined angle, the controller rotary-drives a motor of the starter to restart the engine.

4 Claims, 8 Drawing Sheets

(56) References Cited

U.S. PATENT DOCUMENTS

| | | | |
|---|---|---|---|
| 6,763,903 B2 * | 7/2004 | Morimoto et al. | 180/65.26 |
| 7,023,150 B2 * | 4/2006 | Hisada et al. | 318/34 |
| 7,204,222 B2 * | 4/2007 | Yamauchi et al. | 123/179.4 |
| 7,252,620 B2 * | 8/2007 | Kiuchi | 477/62 |
| 7,270,621 B2 * | 9/2007 | Yamauchi | 477/3 |
| 7,614,377 B2 * | 11/2009 | Noguchi | 123/179.3 |
| 7,788,023 B2 * | 8/2010 | Ando et al. | 701/112 |
| 8,131,452 B2 * | 3/2012 | Senda et al. | 701/110 |
| 8,671,903 B2 * | 3/2014 | Notani | 123/179.4 |
| 2007/0151536 A1 * | 7/2007 | Yamauchi et al. | 123/179.4 |
| 2011/0120405 A1 * | 5/2011 | Notani | 123/179.3 |

FOREIGN PATENT DOCUMENTS

| | | | |
|---|---|---|---|
| JP | 58-166165 A | 10/1983 | |
| JP | 08-189395 A | 7/1996 | |
| JP | 2001-317439 A | 11/2001 | |
| JP | 2002-221059 A | 8/2002 | |
| JP | 2005-315197 A | 11/2005 | |
| JP | 2006-258078 A | 9/2006 | |
| JP | 2009-156219 A | 7/2009 | |
| JP | 2009-265802 | * 11/2009 | 123/179.3 |

* cited by examiner

FIG. 8A OPENING DEGREE OF BRAKE

FIG. 8B OPENING DEGREE OF ACCELERATOR

FIG. 8C FUEL SUPPLY STOP

FIG. 8D VEHICLE SPEED

FIG. 8E LOCK-UP CLUTCH

FIG. 8F DRIVE OF AUXILIARY MACHINES OF ENGINE

FIG. 8G THROTTLE OPENING-DEGREE

FIG. 8H ENGINE RPM

FIG. 8I PUSH-OUT OF PINION GEAR OF STARTER

FIG. 8J DRIVE OF MOTOR OF STARTER

TIME

AUTOMATIC STARTING DEVICE FOR ENGINE

BACKGROUND OF THE INVENTION

1. Field of the Invention

The present invention relates to an automatic starting device for an engine, which is capable of stopping fuel supply when the engine does not need to be driven during an operation and, in addition, of quietly and quickly restarting the engine when a re-acceleration request is made by a driver, in the engine for a vehicle.

2. Description of the Related Art

In order to improve fuel efficiency of a vehicle, a technology of stopping fuel supply to an engine during idling or deceleration during which the vehicle does not need to be driven has been disclosed.

In general engine control, the fuel supply is stopped during deceleration. As an engine rpm is gradually reduced, a clutch is released at a predetermined engine rpm which is larger than an engine rpm during idling. At the same time, the fuel supply is restarted to perform idle control, thereby preventing an engine stall.

Further, as a technology for improving the fuel efficiency, the following is disclosed in JP 08-189395 A (hereinafter, referred to as Patent Document 1), for example. According to the technology disclosed in Patent Document 1, the fuel supply is stopped unless a driver presses down an accelerator pedal. On the other hand, when the driver presses down the accelerator pedal for re-acceleration, the clutch is engaged to restart the fuel supply. If the rotation of the engine is stopped at this time, the engine is restarted by a starter so as to prevent idling, which does not contribute to drive of a vehicle, as much as possible.

Moreover, JP 2002-221059 A (hereinafter, referred to as Patent Document 2) discloses the following technology of restarting the engine. While the accelerator is OFF during deceleration, the fuel supply is stopped. When a pressing amount of a brake pedal is reduced, it is predicted that the driver performs re-acceleration. Therefore, when the engine rpm becomes equal to or less than a resonance rpm, the starter is driven to restart the engine. In Patent Document 2, if recovery from a fuel-supply stop state is made in a region where the engine rpm is small, the engine and a vehicle body resonate with each other. Therefore, when the engine rpm becomes the resonance rpm during the deceleration, auxiliary machines such as a generator and an air conditioner are temporarily driven to allow the engine rpm to quickly pass through a region of the resonance rpm.

JP 2001-317439 A (hereinafter, referred to as Patent Document 3) discloses the following technology of restarting the engine by using the starter. The starter includes a circuit for operating an electromagnetic solenoid for pushing out a pinion gear and a circuit for driving a motor, which are separately provided so as to be independently operated. During an idle stop of the vehicle, the pinion gear is placed in a standby state while being meshed with a ring gear. Simultaneously with a starting operation performed by the driver, the motor is driven to rotate the pinion gear to perform cranking, thereby restarting the engine.

According to the method disclosed in Patent Document 1, however, in the case where the rotation of the engine is stopped, the engine is restarted using the starter. Therefore, each time the accelerator pedal is pressed down during the deceleration, there is a fear in that meshing noise is generated in the starter.

Moreover, according to the method disclosed in Patent Document 2, in the case where a general starter, specifically, a starter including the pinion gear which is pushed out to be meshed with the ring gear, is used, if the starter is driven immediately after the engine rpm becomes equal to or less than the resonance rpm, there is a fear in that the gears fail to mesh with each other to generate big foreign sounds.

Further, Patent Document 3 merely discloses a method of using the starter, in which the push-out of the pinion gear and the motor drive are separately performed, after the vehicle is stopped. Therefore, Patent Document 3 does not cover the technology of expanding the region where the fuel supply is stopped from the deceleration of the vehicle to the idling so as to further improve the fuel efficiency.

SUMMARY OF THE INVENTION

The present invention has been made to solve the problems described above, and has an object of providing an automatic starting device for an engine, which quietly and quickly restarts the engine when a re-acceleration request is made by a driver in the engine which stops fuel supply to the engine in the case where the engine does not need to be driven.

The present invention provides an automatic starting device for an engine including: a vehicle-speed sensor for detecting a speed of a vehicle; an accelerator opening-degree sensor for detecting a pressing amount of an accelerator pedal; a brake opening-degree sensor for detecting a pressing amount of a brake pedal; a crank-angle sensor for detecting an engine rpm, the crank-angle sensor being provided with a reverse-rotation detecting function which enables detecting whether the engine is rotating in a forward direction or a reverse direction; a ring gear coupled with the engine; a starter including: pinion-gear push-out means for pushing out a pinion gear toward the ring gear; and pinion-gear rotary-driving means for rotary-driving the pinion gear, the starter being capable of operating the pinion-gear push-out means and the pinion-gear rotary-driving means in an independent manner; and a controller for controlling a fuel injection amount and ignition timing of the engine, in which: in a case where it is judged based on a detection signal of the vehicle-speed sensor that the vehicle is decelerating and it is also judged based on a detection signal of the accelerator opening-degree sensor that fuel injection is currently stopped, when it is then judged based on a detection signal of the brake opening-degree sensor that the brake pedal is released and the engine rpm detected by the crank-angle sensor is smaller than an engine rpm which allows recovery from a fuel-supply stop state, the controller disengages a lock-up clutch for coupling the engine and a transmission; when reverse rotation of the engine is detected based on a detection signal of the crank-angle sensor, the controller drives the pinion-gear push-out means of the starter to push out the pinion gear to mesh the pinion gear with the ring gear; and after the ring gear is rotated by a predetermined angle, the controller rotary-drives the pinion-gear rotary-driving means of the starter to restart the engine.

According to the automatic starting device for the engine according to the present invention, in the case where the engine is to be restarted by the starter so as to be ready for re-acceleration performed by a driver while the fuel supply is stopped at the time of deceleration, the pinion gear is pushed out to be meshed with the ring gear when the rotation of the engine is reversed. Then, the motor is driven to rotate the pinion gear after it is ensured that the gears mesh with each

DETAILED DESCRIPTION OF THE PREFERRED EMBODIMENTS

Hereinafter, a preferred embodiment of an automatic starting device for an engine according to the present invention is described referring to the accompanying drawings.

First Embodiment

Figure 1:
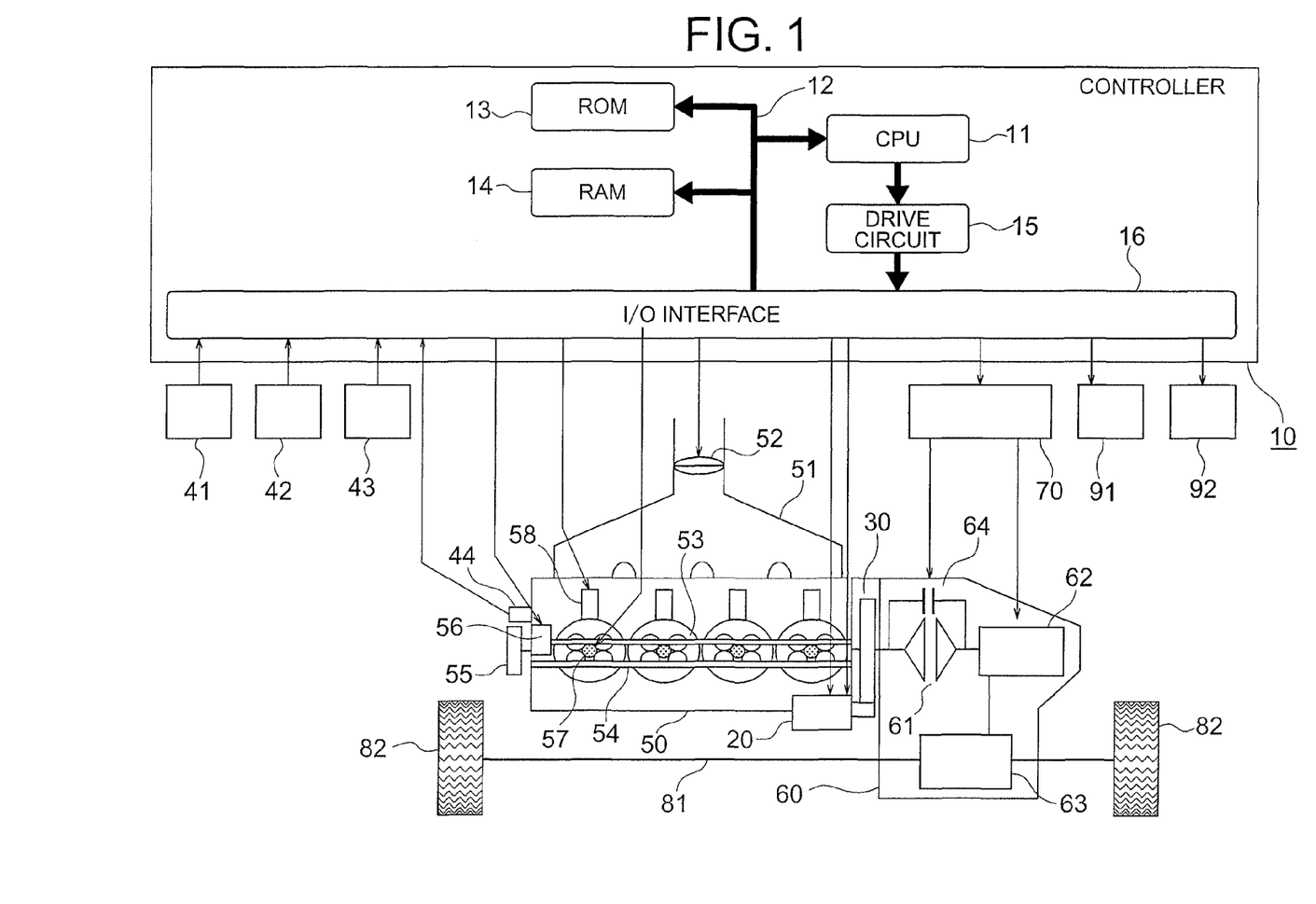
FIG. 1 is a view illustrating a configuration of an engine and a control device for the engine, which includes an automatic starting device for the engine according to a first embodiment of the present invention.

An automatic starting device for an engine according to a first embodiment of the present invention is described referring to FIGS. 1 to 8. FIG. 1 is a view illustrating a configuration of an engine and a control device for the engine, which includes the automatic starting device for the engine according to the first embodiment of the present invention. Hereinafter, in each of the drawings, the same reference numerals denote the same or equivalent components.

In FIG. 1, a controller 10 for controlling an engine 50 and an automatic transmission 60 is provided. The controller 10 includes a CPU 11, a ROM 13, a RAM 14, a drive circuit 15, an I/O interface 16, and the like. The ROM 13 and the RAM 14 are connected to the CPU 11 through a bus 12. The drive circuit 15 is for driving actuators.

A program for controlling the engine 50 and the automatic transmission 60 is prestored in the ROM 13. According to the program stored in the ROM 13, the controller 10 computes the amount of operation of each of various actuators based on input values of various sensors to drive the various actuators through an intermediation of the drive circuit 15, thereby obtaining a desired operation.

Moreover, as illustrated in FIG. 1, a starter 20 for assisting engine start-up and a ring gear 30 coupled to the engine 50 are provided.

Moreover, as illustrated in FIG. 1, a brake opening-degree sensor 41, an accelerator opening-degree sensor 42, a vehicle-speed sensor 43, and a crank-angle sensor 44 are provided. The brake opening-degree sensor 41 detects an opening degree of a brake pedal to be able to detect a pressing amount of the brake pedal. The accelerator opening-degree sensor 42 detects an opening degree of an accelerator pedal to be able to detect a pressing amount of the accelerator pedal. The vehicle-speed sensor 43 detects a speed of a vehicle. The crank-angle sensor 44 detects an engine rpm. In addition, the crank-angle sensor 44 also has a reverse-rotation detecting function so as to be able to detect whether the engine is rotating in a forward direction or a reverse direction, which is disclosed in, for example, Patent Document 4.

Moreover, as illustrated in FIG. 1, the engine 50 and an intake system 51 which includes an intake manifold and a surge tank. An electronically-controlled throttle 52, which is provided in the middle of the intake system 51, changes a throttle opening-degree by a drive signal of the controller 10 to be able to control an engine output. An intake camshaft 53 and an exhaust camshaft 54 are respectively provided on an intake valve and an exhaust valve of the engine 50. The intake camshaft 53 and the exhaust camshaft 54 are connected to a crank pulley 55 through a belt and rotate in synchronization with the rotation of the engine 50 to open and close the intake valve and the exhaust valve. Moreover, an intake cam timing controller 56 is mounted to the intake camshaft 53 to be connected thereto through an intermediation of a belt from the crank pulley 55 so as to rotate in synchronization with the rotation of the engine 50. The intake cam timing controller 56 creates a phase difference between the rotation of the engine 50 and the rotation of the intake camshaft 53 by the drive signal from the controller 10 to be able to change opening/closing timing of the intake valve. For controlling each of the throttle opening-degree and the intake valve opening/closing timing, the controller 10 computes an appropriate amount of operation based on the pressing amount of the accelerator pedal, which is detected by the accelerator opening-degree sensor 42, the engine rpm, and the like.

Moreover, as illustrated in FIG. 1, an ignition device 57 is mounted to each cylinder. For example, the ignition device 57 is an ignition coil including an igniter. A spark plug is mounted at the tip of the ignition coil. By an ignition signal from the controller 10, ignition timing of each of the cylinders may be controlled.

Similarly, an injector 58 for injecting a fuel is mounted to each of the cylinders. A fuel injection amount for each cylinder may be changed according to a width of a drive pulse from the controller 10. For each of the fuel injection amount and the ignition timing, the controller 10 computes an appropriate amount of operation based on the engine rpm, which is detected by the crank-angle sensor 44, an intake air amount detected by an airflow sensor (not shown) provided upstream of the electronically-controlled throttle 52, and the like. In this manner, the ignition devices 57 and the injectors 58 are controlled. (Control signal lines extending from the controller 10 are connected respectively to the ignition devices 57 and the injectors 58 of the cylinders. In this manner, the ignition devices 57 and the injectors 58 may be individually controlled for each cylinder. In FIG. 1, the connection of the control signal lines is illustrated only for a representative one of the cylinders.)

Moreover, as illustrated in FIG. 1, the automatic transmission 60 and a hydraulic circuit for automatic transmission 70 are provided. The automatic transmission 60 includes a fluid torque converter 61 provided in a portion for receiving motive power of the engine 50, a transmission 62 provided in a subsequent stage, and a final-stage reducer 63. The fluid torque converter 61 includes a pump and a turbine which are opposed to each other. The transmission 62 includes a plurality of gear trains, a hydraulic clutch, and the like. The automatic transmission 60 is provided with a lock-up clutch 64 which mechanically transmits the motive power of the engine 50 so as to reduce a motive power loss due to the fluid in the torque converter 61 in a high-speed steady running state and the like. The controller 10 controls a transmission gear ratio or a direct-coupling ratio of the lock-up clutch 64 through an intermediation of the hydraulic circuit for automatic transmission 70 based on the vehicle speed detected by the vehicle-speed sensor 43 and the opening degree of the accelerator. The hydraulic circuit for automatic transmission 70 includes a hydraulic pump for generating an oil pressure, a solenoid valve for controlling the oil pressure, and the like.

Further, as illustrated in FIG. 1, an axle 81 connected to the final-stage reducer 63, and drive wheels 82 of the vehicle, which are connected to the axle 81, are provided. Moreover, auxiliary machines such as a generator 91 and an air conditioner 92 are also provided.

Figure 2:
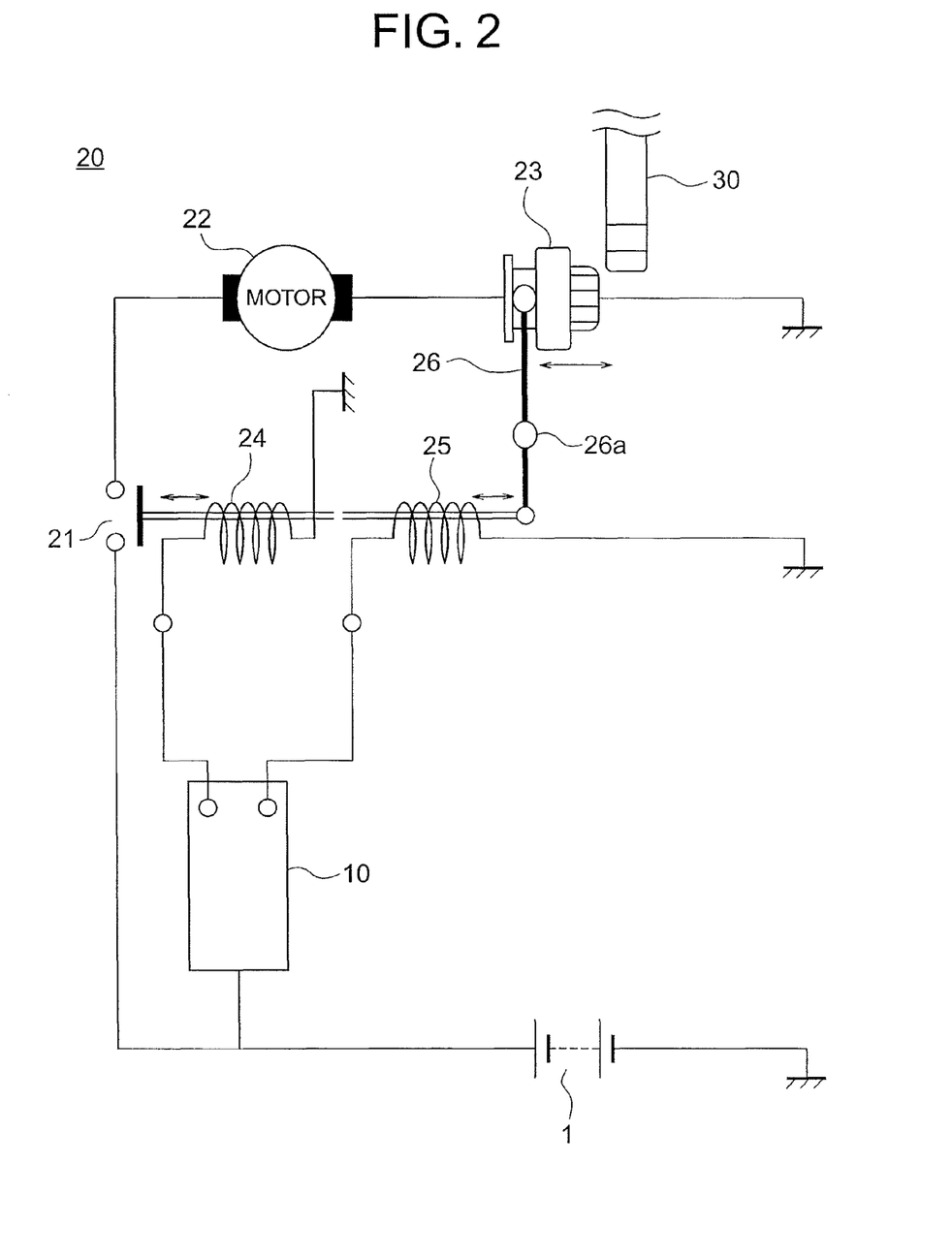
FIG. 2 is a view illustrating a configuration of a starter of the automatic starting device for the engine according to the first embodiment of the present invention.

FIG. 2 is a view illustrating a configuration of the starter 20 of the automatic starting device for the engine according to the first embodiment of the present invention.

As illustrated in FIG. 2, the starter 20 includes a switch 21, a motor 22, a pinion gear 23, and electromagnetic solenoids 24 and 25. The switch 21 is connected to the battery 1. The motor 22 rotates the pinion gear 23. The electromagnetic solenoid 24 turns the switch 21 ON/OFF, whereas the electromagnetic solenoid 25 moves a lever 26 about a supporting point 26a serving as a center of movement.

As illustrated in FIG. 2, a switch (not shown) provided in the drive circuit 15, which drives the electromagnetic solenoid 25 for moving the lever 26 for pushing out the pinion gear 23, and a switch (not shown) provided in the drive circuit 15, which drives the electromagnetic solenoid 24 for moving the motor 22 for rotating the pinion gear 23, are separately provided. Therefore, the controller 10 may operate each of the switches in an independent manner.

Next, an operation of the automatic starting device for the engine according to this first embodiment is described referring to the drawings.

Figure 3:
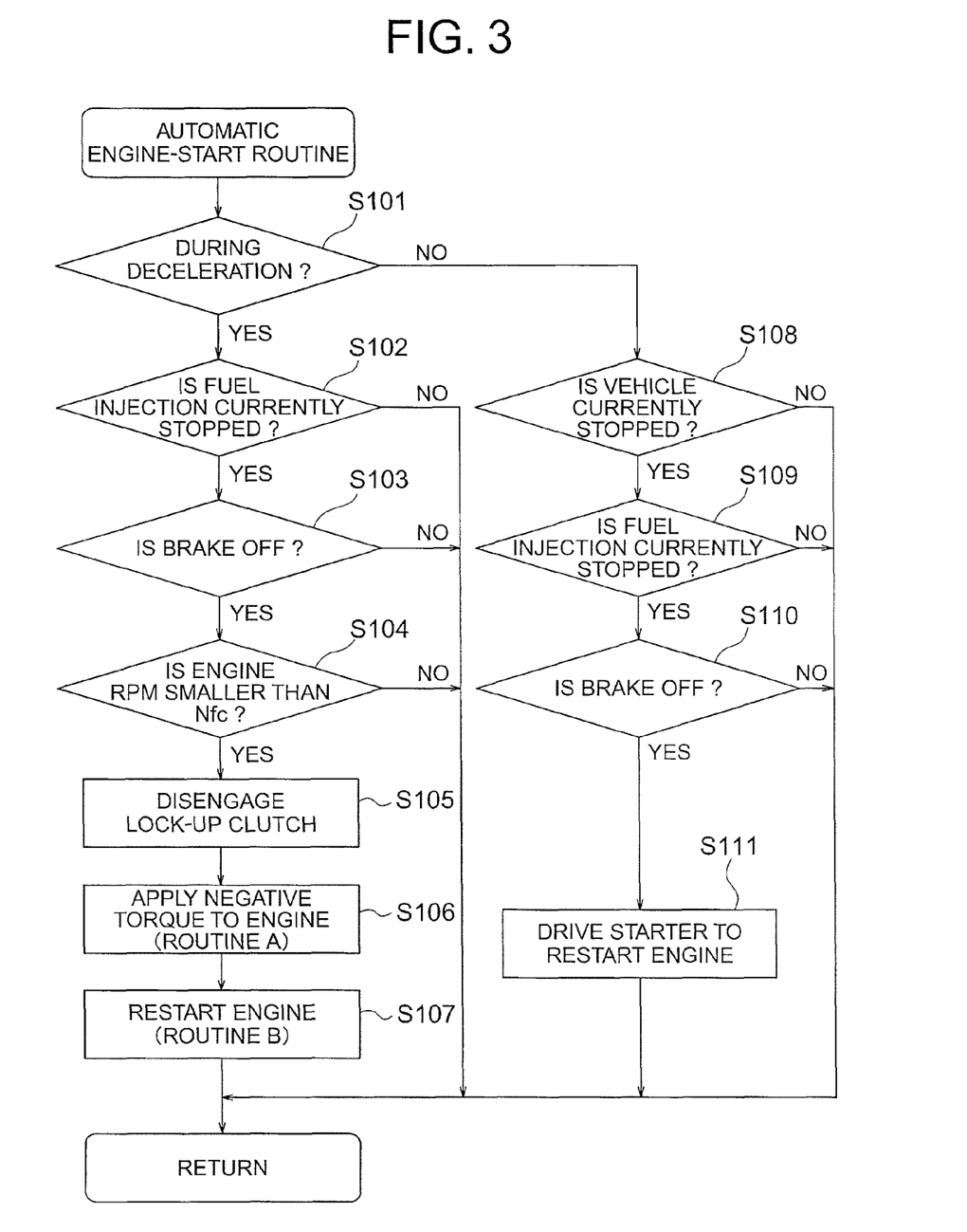
FIG. 3 is a flowchart illustrating an operation of the automatic starting device for the engine according to the first embodiment of the present invention.
Figure 4:
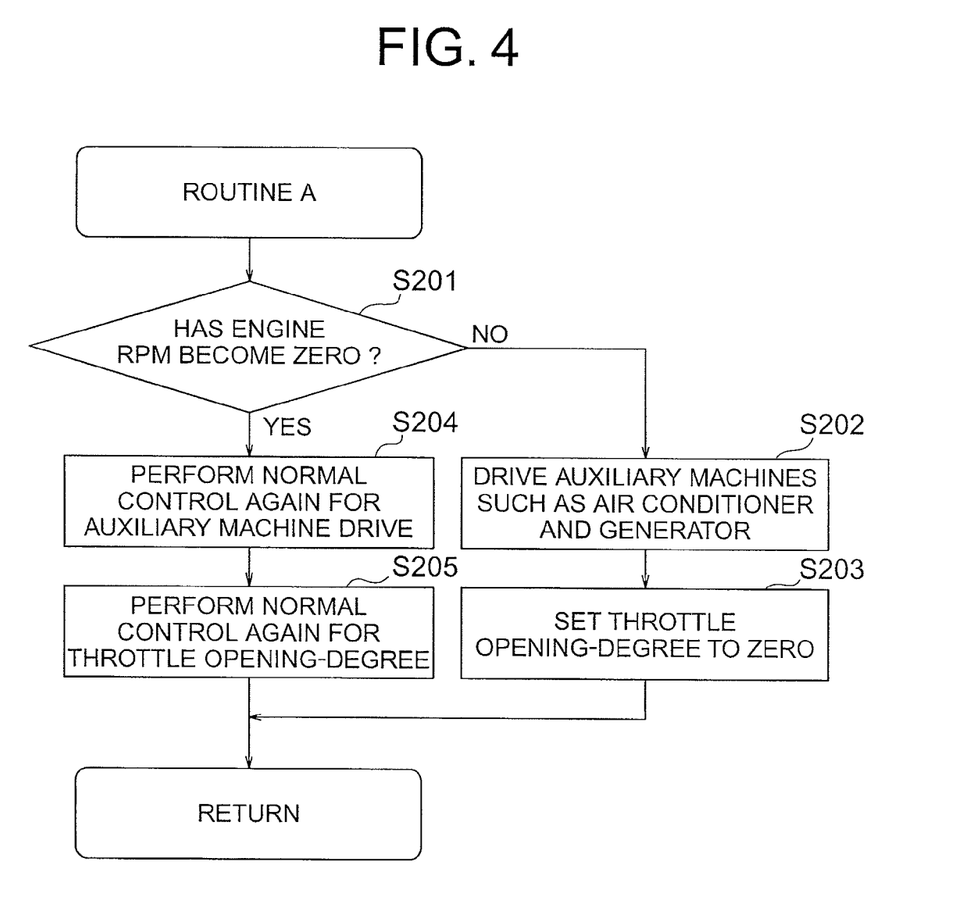
FIG. 4 is another flowchart illustrating the operation of the automatic starting device for the engine according to the first embodiment of the present invention.
Figure 5:
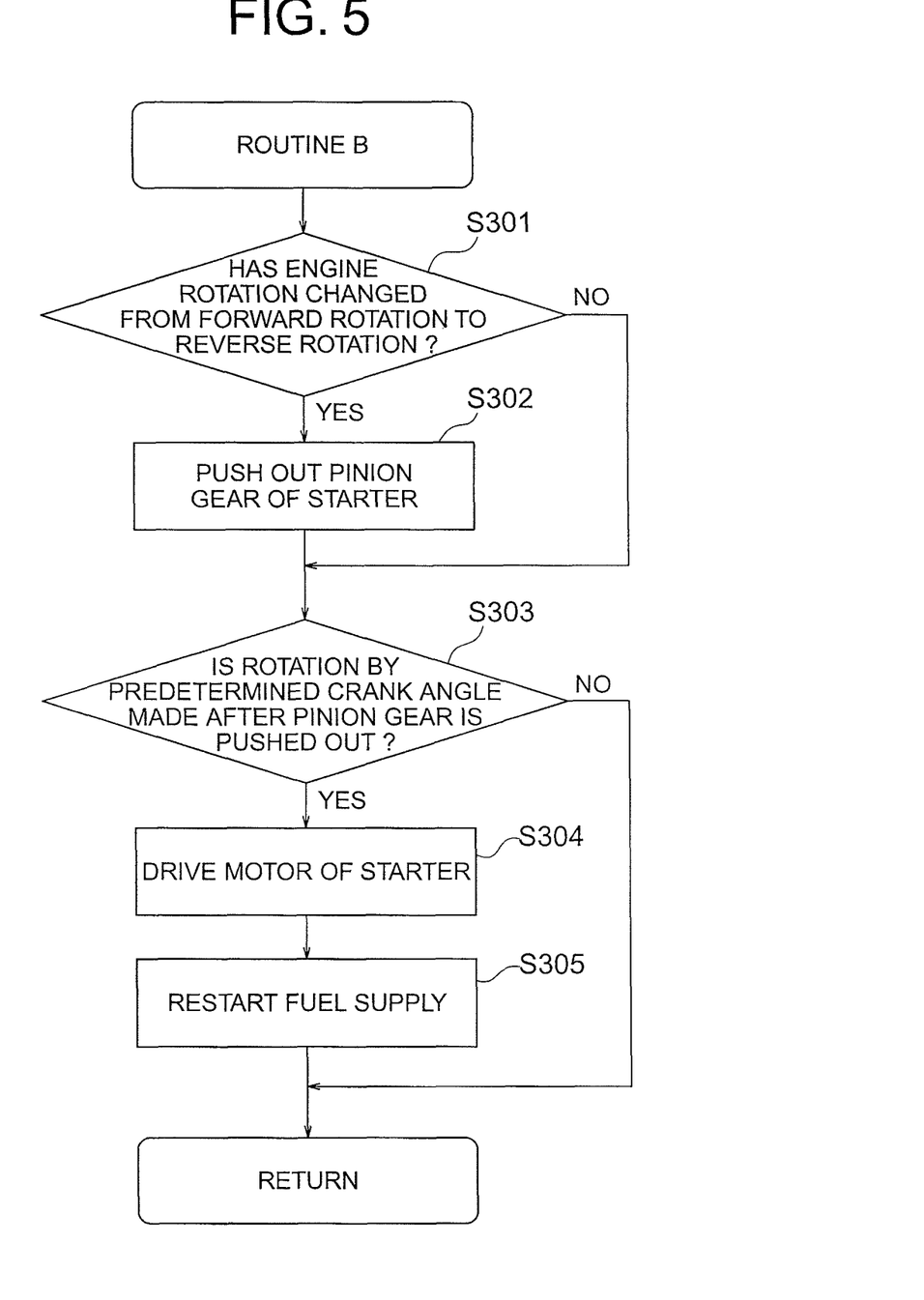
FIG. 5 is still another flowchart illustrating the operation of the automatic starting device for the engine according to the first embodiment of the present invention.
Figure 6:
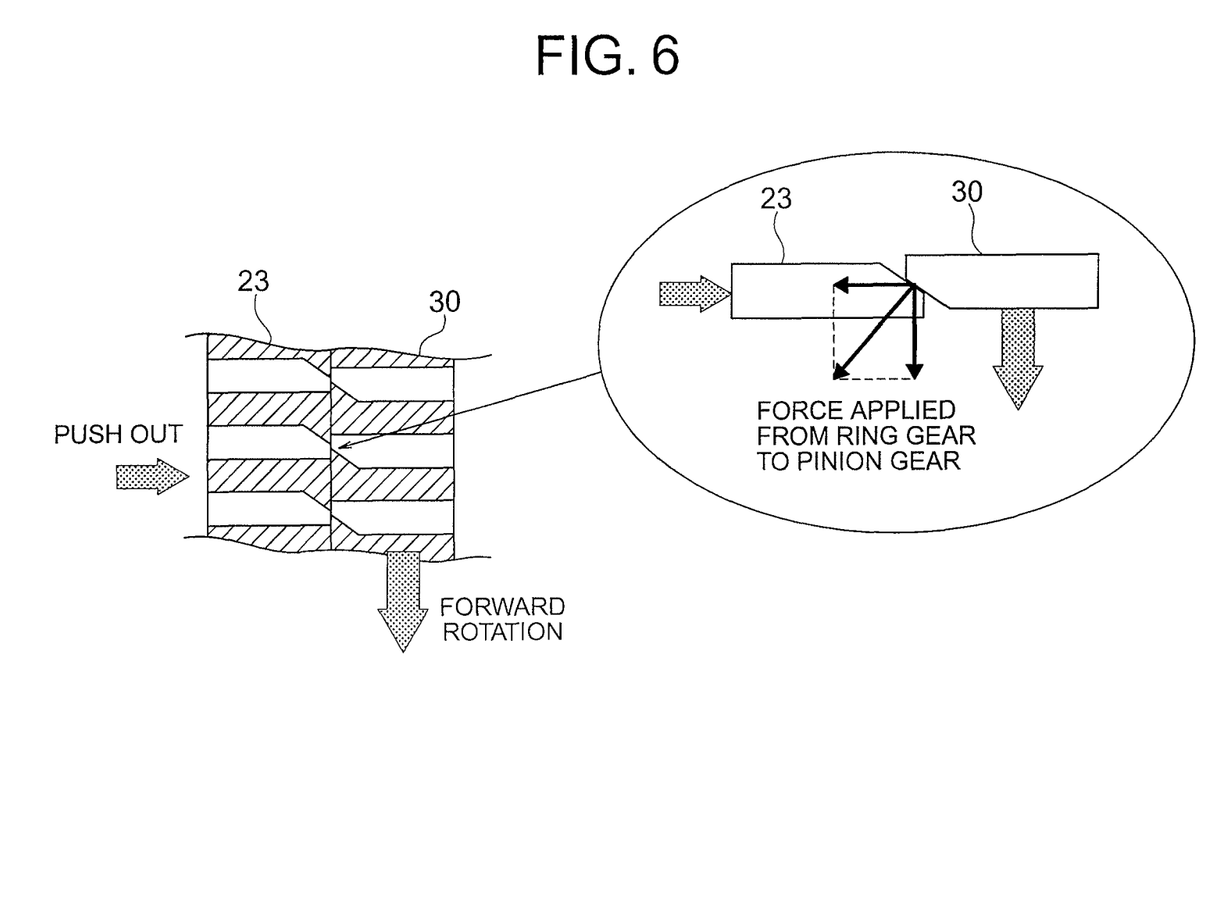
FIG. 6 is a view for describing a mechanism in which a pinion gear and a ring gear of the automatic starting device for the engine are brought into mesh engagement according to the first embodiment of the present invention.
Figure 7:
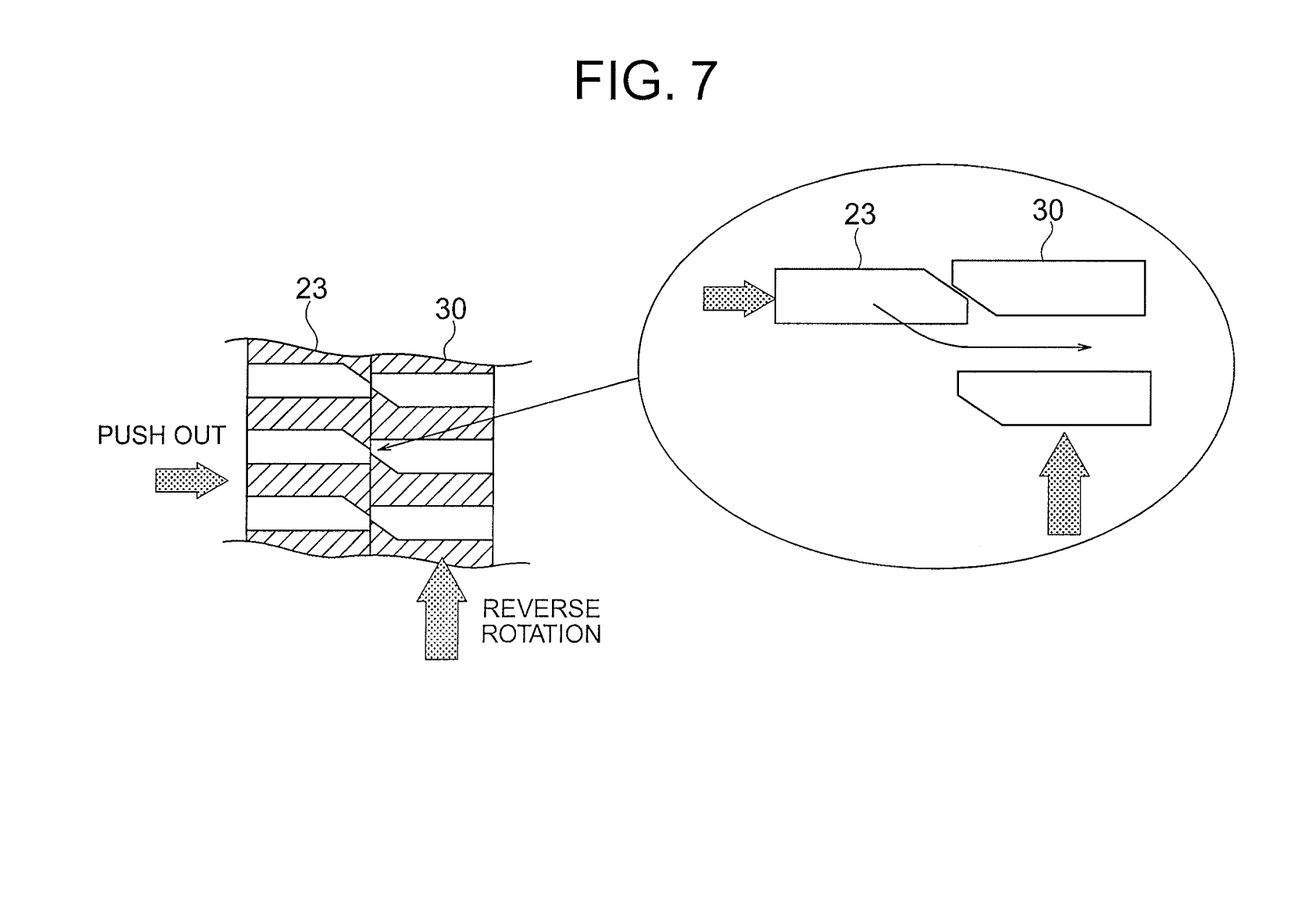
FIG. 7 is another view for describing the mechanism in which the pinion gear and the ring gear of the automatic starting device for the engine are brought into mesh engagement according to the first embodiment of the present invention.

FIGS. 3, 4, and 5 are flowcharts each illustrating the operation of the automatic starting device for the engine according to the first embodiment of the present invention. FIGS. 6 and 7 are views each illustrating a mechanism in which the pinion gear and the ring gear of the automatic starting device for the engine according to the first embodiment of the present invention are brought into mesh engagement. Further, FIGS. 8A-8J are a timing chart illustrating the operation of the automatic starting device for the engine according to the first embodiment of the present invention.

An automatic engine-start routine illustrated in FIG. 3 is incorporated into a part of an engine control main routine for controlling the fuel injection amount, the ignition timing, and an air amount of the engine 50. The automatic engine-start routine is executed at every predetermined time interval. In general, the fuel supply is stopped while the vehicle does not need to be driven, which corresponds to the case where the accelerator pedal is released, in other words, the pressing amount of the accelerator pedal, which is detected by the accelerator opening-degree sensor 42, is zero. Therefore, the vehicle gradually decelerates. The flowcharts of FIGS. 3 to 5 assume, for example, the following condition. When a traffic light in front is red, a driver puts on the brake to decelerate the vehicle. Just as the vehicle is about to completely stop, the traffic light in front turns green from red. Then, the driver releases the brake pedal for re-acceleration.

First, in Step S101 of the automatic engine-start routine, the controller 10 judges, based on the vehicle speed detected by the vehicle-speed sensor 43, whether or not the vehicle is decelerating. When the vehicle is not decelerating (NO), the processing proceeds to Step S108. When it is judged in Step S108 that the vehicle has already been stopped and the brake is released to be OFF in a fuel-injection stop state (Steps S109 to S110), the processing proceeds to Step S111. In Step S111, similarly to a conventional general starter, the electromagnetic solenoids 24 and 25 of the starter 20 are simultaneously driven to push out the pinion gear and to drive the motor at the same time to perform cranking, thereby restarting the engine. On the other hand, when the vehicle is decelerating (YES), the processing proceeds to Step S102.

Next, in Step S102, whether or not the fuel injection is currently stopped is judged based on the pressing amount of the accelerator pedal, which is detected by the accelerator opening-degree sensor 42. When the fuel injection is not currently stopped (NO), the processing proceeds to RETURN. On the other hand, when the fuel injection is currently stopped (YES), the processing proceeds to Step S103.

Next, in Step S103, whether or not the brake pedal is being pressed down is judged based on the opening degree of the brake, which is detected by the brake opening-degree sensor 41. When the brake pedal is being pressed down (NO), the processing proceeds to RETURN. On the other hand, when the driver releases the brake pedal (YES), it is judged that the driver intends to re-accelerate the vehicle. Therefore, the processing proceeds to Step S104.

Next, in Step S104, whether or not the engine rpm, which is detected by the crank-angle sensor 44, is smaller than an engine rpm Nfc which allows recovery from the fuel-supply stop state is judged. When the engine rpm is not smaller than the engine rpm Nfc (NO), the processing proceeds to RETURN. On the other hand, when the engine rpm is smaller than the engine rpm Nfc which allows the recovery from the fuel-supply stop state (YES), the processing proceeds to Step S105.

Next, in Step S105, the lock-up clutch 64 is disengaged. The transmission 62 and the engine 50 are directly coupled by the lock-up clutch 64 until the declutching, and hence the engine 50 has been rotated by the drive system. However, when the lock-up clutch 64 is disengaged, the engine rpm starts decreasing due to a mechanical friction torque of the engine 50.

Next, in Step S106, simultaneously with the disengagement of the lock-up clutch 64, a routine A for applying a negative torque to the engine is executed.

In the routine A, as illustrated in FIG. 4, Steps S202 and S203 are executed until the rpm of the engine 50 rotating in a forward direction becomes a zero rpm. Specifically, the generator 91, the air conditioner 92, and the like are turned ON to increase an auxiliary-machine driving load. In addition, the throttle opening-degree is set to zero by the electronically-controlled throttle 52 to increase a pumping load. In this manner, a load torque on the engine 50 is increased to increase a speed of reducing the engine rpm. As a result, the engine rpm becomes more likely to be below the zero rpm to reverse the rotation of the engine. Moreover, the speed of reducing the engine rpm is increased to shorten a time period from the release of the brake pedal to the push-out of the pinion gear 23 of the starter 20. Therefore, the engine may be quickly restarted to meet a re-acceleration request made by the driver. Once the engine rpm becomes zero, Steps S204 and S205 are executed to perform the normal control again for both the drive of the auxiliary machines and the throttle opening-degree.

The auxiliary machines such as the generator 91 and the air conditioner 92 are driven after the lock-up clutch 64 provided between the engine 50 and the transmission 62 is disengaged. In addition, the throttle opening-degree is reduced to increase a pumping loss. Therefore, the speed of reducing the engine rpm is increased to ensure the reverse rotation of the engine 50. Moreover, a time period, in which the engine 50 rotates in the forward direction, is reduced, and hence the time period from the release of the brake pedal by the driver to the restart of the engine 50 may be shortened. Accordingly, when the driver presses down the accelerator pedal, smooth re-acceleration may be obtained.

As a final routine, in Step S107, a routine B for restarting the engine 50 is executed.

In the routine B, as illustrated in FIG. 5, in Step S301, timing at which the engine rpm is reduced to reverse the rotation of the engine is detected by the crank-angle sensor 44 having the reverse-rotation detecting function. Then, the processing proceeds to Step S302. In Step S302, the electromagnetic solenoid 25 of the starter 20 is driven to push out the pinion gear 23, thereby causing the pinion gear 23 to be meshed with the ring gear 30.

An operation of bringing the pinion gear 23 and the ring gear 30 into mesh engagement when the rotation of the engine is reversed is now described referring to FIGS. 6 and 7.

As illustrated in FIG. 6, in general, while the engine is rotating in the forward direction, that is, the ring gear 30 is rotating in the forward direction, a diagonally-cut cross section of the pinion gear 23 and that of the ring gear 30 collide against each other even when the pinion gear 23 is pushed out. The pinion gear 23 is pushed back by the ring gear 30 at this time, and hence the pinion gear 23 and the ring gear 30 do not mesh with each other. As a result, collision noises are continuously generated while the ring gear 30 is rotating in the forward direction.

However, when the rotation of the engine is reversed to reverse the rotation of the ring gear 30 as illustrated in FIG. 7, the pinion gear 23 slides on the diagonally-cut cross section of the ring gear 30 to allow the pinion gear 23 and the ring gear 30 to completely mesh with each other. This is relatively the same behavior as the operation in which the pinion gear 23 is pushed out in the state where the engine 50 is stopped to allow the pinion gear 23 rotated by the motor 22 to be meshed with the ring gear 30. Moreover, the engine 50 is rotated in the reverse direction at a speed as small as about several rpm to several tens of rpm, and hence the pinion gear 23 is not abraded due to the collision against the ring gear 30.

In Step S303 illustrated in FIG. 5, after the rotation of the ring gear 30 by a degree of angle, which is required to allow the pinion gear 23 to be meshed with the ring gear 30, more specifically, the rotation for advancing the ring gear 30 by about one tooth, is made, the processing proceeds to Step S304. In the state where the pinion gear 23 is pushed out, it is ensured that the ring gear 30 is meshed with the pinion gear 23 if the ring gear 30 is advanced by one tooth. The completion of meshing is judged based on the crank angle detected by the crank-angle sensor 44 in this case, it is apparent that the judgment may also be made based on time.

Next, in Step S304, the electromagnetic solenoid 24 of the starter 20 is driven to rotate the motor 22, thereby cranking the engine 50.

As a final step, in Step S305, simultaneously with the cranking of the engine 50, the fuel is supplied from the injectors 58 to complete the restart. The automatic engine-start routine is performed as described above.

Subsequently, referring to FIGS. 8A-8J, a behavior of each of the parameters at the time of execution of the automatic engine-start routine is described.

Figure 8A:
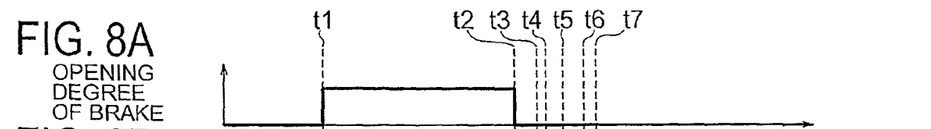
FIGS. 8A-8J are a timing chart illustrating the operation of the automatic starting device for the engine according to the first embodiment of the present invention.
Figure 8B:
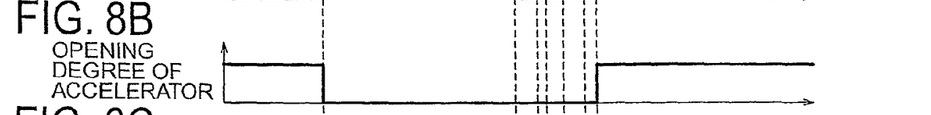
Figure 8C:
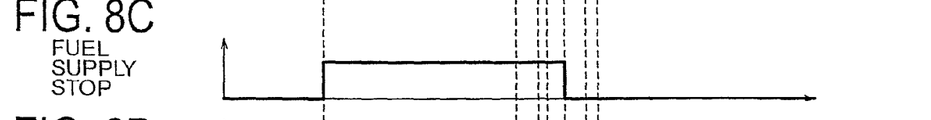
Figure 8D:
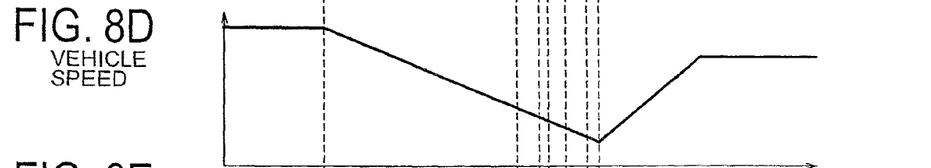

When the driver releases the accelerator pedal and then presses down the brake pedal (at a time point t1) as illustrated in FIGS. 8A and 8B, the fuel supply is stopped at the time point t1 to gradually decelerate the vehicle as illustrated in FIGS. 8C and 8D.

Figures 8E, 8F:
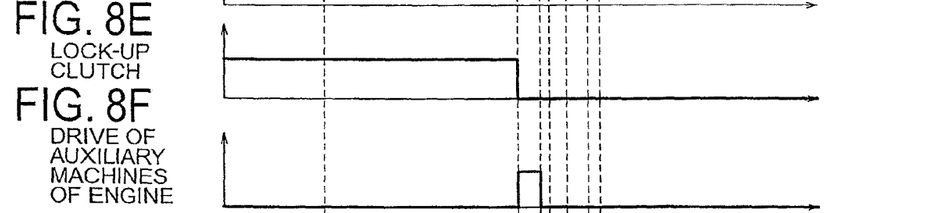

Before the vehicle completely stops after the deceleration as illustrated in FIG. 8D, for example, when the signal light in front of the driver turns green from red and therefore the driver releases the brake pedal for re-acceleration (at a time point t2) as illustrated in FIG. 8A, the lock-up clutch 64 is disengaged at the time point t2 as illustrated in FIG. 8E. Therefore, the engine 50, which has been driven by the drive system until then, reduces the rpm due to its own mechanical friction torque acting as a negative torque as illustrated in FIG. 8H.

Figure 8G:
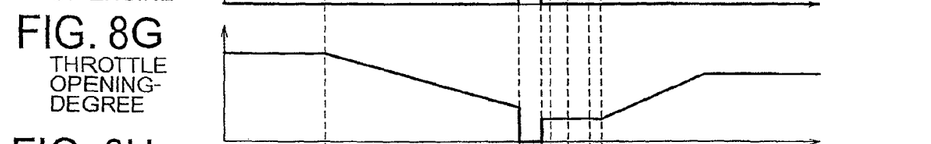

At this time, the auxiliary machines such as the generator 91, the air conditioner 92, and the like are driven as illustrated in FIG. 8F. In addition, the throttle opening-degree is set to zero to increase the pumping load (from the time point t2 to a time point t3) as illustrated in FIG. 8G. Therefore, the negative torque on the engine 50 is increased to increase the speed of reducing the engine rpm, as illustrated in FIG. 8H. In this manner, a period of time in which the engine 50 automatically continues rotating is reduced to be shorter than usual. In addition, the rotation of the engine 50 is more likely to be below the zero rpm to be reversed owing to inertia. At the time point t3, as illustrated in FIGS. 8F and 8G, the drive of the auxiliary machines is stopped, and the throttle opening-degree is set to that used for engine start control to prepare for restarting the engine.

Figures 8H, 8I:
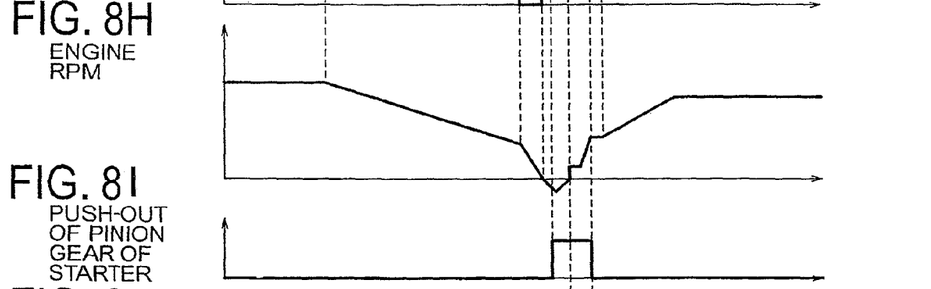

Then, when the rotation of the engine 50 is reversed as illustrated in FIG. 8IH, the electromagnetic solenoid 25 of the starter 20 is driven to push out the pinion gear 23 as illustrated in FIG. 8M (at a time point t4). At this time, the ring gear 30 is rotating in the reverse direction at a moderate speed. After the pushed-out pinion gear 23 is brought into abutment against the ring gear 30 on their end surfaces, the ring gear 30 is moved out of abutment to allow the pinion gear 23 and the ring gear 30 to completely mesh with each other. Alternatively, the pinion gear 23 and the ring gear 30 may completely mesh with each other without bringing the end surface of the pinion gear 23 into abutment against the end surface of the ring gear 30. Because of the slow rotation of the ring gear 30 and application of no driving force to the pinion gear 23, the pinion gear 23 may be quietly and smoothly meshed with the ring gear 30.

Figure 8J:
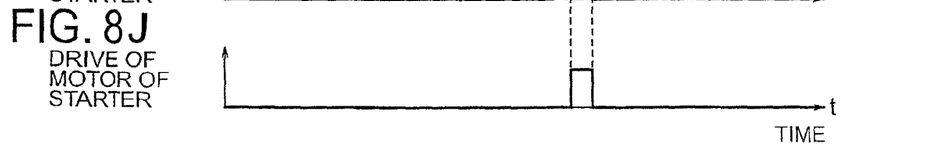

After the rotation by the predetermined crank angle is made until the pinion gear 23 is pushed out to be reliably meshed with the ring gear 30 (at a time point t5), the electromagnetic solenoid 24 of the starter 20 is driven to rotate the motor 22, thereby performing cranking as illustrated in FIG. 8J. As illustrated in FIG. 8C, the fuel supply is restarted simultaneously with the cranking, thereby restarting the engine. After that, when the driver presses down the accelerator pedal (at a time point t7), the restart of the engine 50 has already been completed. Therefore, with the press of the accelerator pedal, the smooth acceleration may be performed.

What is claimed is:

1. An automatic starting device for an engine, comprising:
a vehicle-speed sensor for detecting a speed of a vehicle;
an accelerator opening-degree sensor for detecting a pressing amount of an accelerator pedal;
a brake opening-degree sensor for detecting a pressing amount of a brake pedal;
a crank-angle sensor for detecting an engine rpm, the crank-angle sensor being provided with a reverse-rotation detecting function which enables detecting whether the engine is rotating in a forward direction or a reverse direction;
a ring gear coupled with the engine;
a starter including: pinion-gear push-out means for pushing out a pinion gear toward the ring gear; and pinion-gear rotary-driving means for rotary-driving the pinion gear, the starter being capable of operating the pinion-gear push-out means and the pinion-gear rotary-driving means in an independent manner; and
a controller for controlling a fuel injection amount and ignition timing of the engine, wherein:
in a case where it is judged based on a detection signal of the vehicle-speed sensor that the vehicle is decelerating and it is also judged based on a detection signal of the accelerator opening-degree sensor that fuel injection is currently stopped, when it is then judged based on a detection signal of the brake opening-degree sensor that the brake pedal is released and the engine rpm detected by the crank-angle sensor is smaller than an engine rpm which allows recovery from a fuel-supply stop state, the controller disengages a lock-up clutch for coupling the engine and a transmission;
when reverse rotation of the engine is detected based on a detection signal of the crank-angle sensor, the controller drives the pinion-gear push-out means of the starter to push out the pinion gear to mesh the pinion gear with the ring gear; and
after the ring gear is rotated by a predetermined angle, the controller rotary-drives the pinion-gear rotary-driving means of the starter to restart the engine.

2. An automatic starting device for the engine according to claim 1, wherein the controller drives an auxiliary machine acting as a torque load on the engine from the disengagement of the lock-up clutch until the engine rpm becomes zero.

3. An automatic starting device for the engine according to claim 1, further comprising an electronically-controlled throttle for changing a throttle opening-degree,
wherein the controller controls the electronically-controlled throttle to set the throttle opening-degree to zero from the disengagement of the lock-up clutch until the engine rpm becomes zero.

4. An automatic starting device for the engine according to claim 2, further comprising an electronically-controlled throttle for changing a throttle opening-degree,
wherein the controller controls the electronically-controlled throttle to set the throttle opening-degree to zero from the disengagement of the lock-up clutch until the engine rpm becomes zero.

* * * * *